E. W. SKINNER.
Sorghum Evaporator.
No. 50,424.
Patented Oct. 10, 1865.
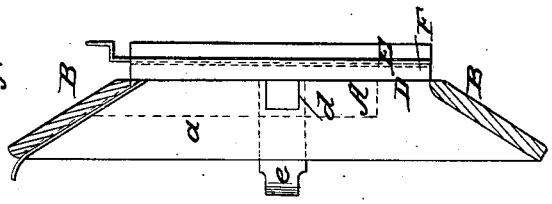
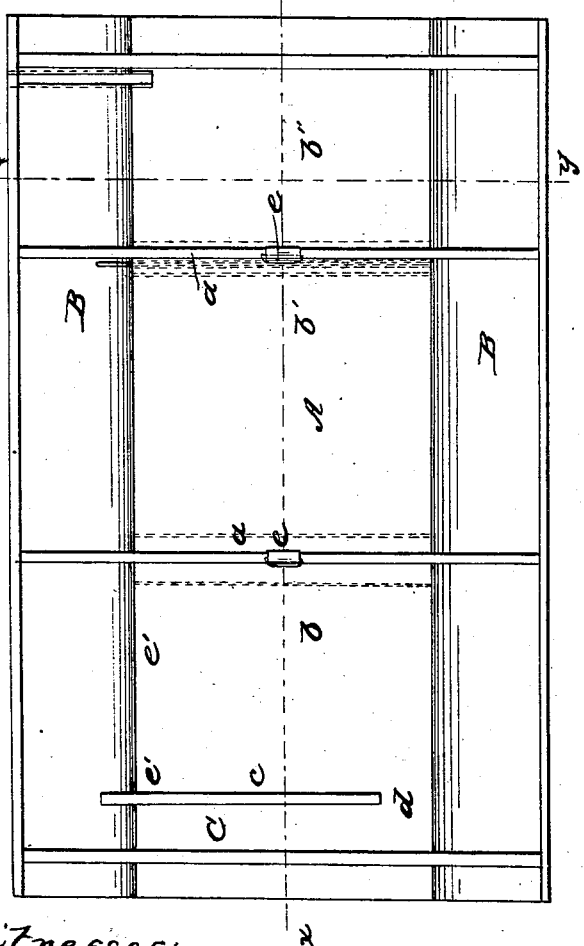
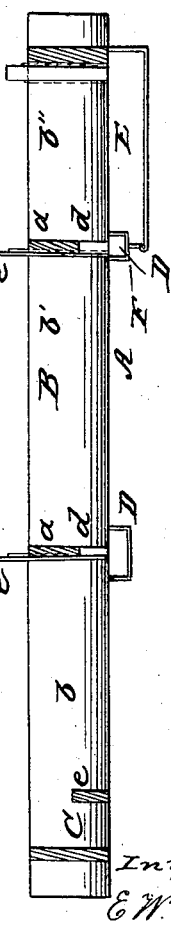

UNITED STATES PATENT OFFICE.

E. W. SKINNER, OF MADISON, WISCONSIN, ASSIGNOR TO HIMSELF AND O. S. WILLEY, OF SAME PLACE.

IMPROVED SORGHUM-EVAPORATOR.

Specification forming part of Letters Patent No. 50,424, dated October 10, 1865.

*To all whom it may concern:*

Be it known that I, E. W. SKINNER, of Madison, in the county of Dane and State of Wisconsin, have invented a new and Improved Sugar-Pan or Sorghum-Evaporator; and I do hereby declare that the following is a full, clear, and exact description thereof, which will enable those skilled in the art to make and use the same, reference being had to the accompanying drawings, forming part of this specification, in which—

Figure 1 is a plan or top view of my invention; Fig. 2, a longitudinal vertical section of the same, taken in the line $x\ x$, Fig. 1; Fig. 3, a transverse vertical section of the same, taken in the line $y\ y$, Fig. 1.

Similar letters of reference indicate corresponding parts.

The object of this invention is to obtain a sugar-pan or sorghum-evaporator which will meet all the requisites of the pretentious, expensive, and first-class articles now in use, and still combine the essential qualifications of simplicity of construction, ease of working, durability, cheapness of manufacture, and facility of transportation, so as to be within the reach of all classes of sorghum cultivators. These points, it is believed, are fully attained by my invention.

The general form of my pan is straight, with a horizontal bottom, A, flaring or inclined sides B B, and two transverse partitions, $a\ a$, which divide the pan into three compartments, $b\ b'\ b''$, as shown in Figs. 1 and 2. In the first compartment, $b$, of the pan there is a ledge or partition, $c$, which extends from one side B nearly across the pan, as shown clearly in Fig. 1, and in each partition $a\ a$ there is an opening, $d$, which is closed, when necessary, by sliding gates $e$, shown more particularly in Fig. 2. The ledge or partition $c$ forms a recess or passage, C, through which the cold juice is admitted or passes into the first compartment or division, $b$, of the pan in a gradual stream, and, meeting the boiling juice at the mouth or outlet $d$, is forced by the boiling juice back along the ledge to the opposite side of the pan at $e'$, forming an eddy and causing a cool place where there is no boiling, and where the scum will gather and can be readily removed by the operator as it rises during the process of rapid boiling in the other parts of the compartment or division $b$. The openings $d$ are at the centers of the partitions $a\ a$, in order that the juice may be drawn from one compartment to the other with less liability of the scum passing through than if the openings were near the sides of the pan, for there is more heat at the center than at the sides of the pan, and the boiling at the former is more intense or rapid than at the latter, and has a tendency to throw the scum to the sides of the pan.

D D are cold-air ducts which are placed transversely under the pan in line with the partitions $a\ a$, said ducts extending through the arch on which the pan is placed, and keeping the bottom of the latter underneath the partitions in a cool state, and favoring the lodgement of the scum by the side of said partitions in case it is not all taken off at $e'$. These cold-air ducts also afford a protection to the partitions from heat, so that wood may be used for the partitions instead of metal.

E is an air-chamber underneath the compartment or division $b''$, said chamber having a damper, F, at its rear end. By means of this chamber and damper the application of the fire or heat to the compartment $b''$ may be controlled as required, for when the damper is closed nothing but hot air comes in contact with the bottom of the compartment $b''$.

One of the most important things in the evaporation of sirup is to avoid the scorching of the same when the operation is nearly completed, and this is rendered certain by closing the damper at the proper time, and by adjusting the damper the entire heat of the furnace, or as much thereof as desired, may be obtained at any time.

The pan being made in one piece, with the chamber E and damper F under the finishing-division, the pan may be set upon a plain arch, thereby avoiding the labor necessary to set separate flues and dampers. The inside of the pan is smooth, without ridges or creases to catch the gummy matter deposited during the boiling operation. It is thereby easily cleaned or scrubbed out when necessary.

By the use of wooden partitions the frame can be securely bolted together and the pan built much cheaper than if metal partitions were used.

In working the pan the cold juice enters the largest division, b, which is over the front end of the arch, and after being thoroughly defecated it is drawn into the middle division, b', where it is further reduced and drawn into the finishing-division, b''. When the juice is nearly reduced to the required consistency, the damper F is closed and the evaporating process completed under the application of hot air alone. The sirup is then drawn off from b'', another quantity admitted into it from division b', which is in turn supplied from the division b.

I claim as new and desire to secure by Letters Patent—

1. The ledge c, extending from one side nearly to the other of a pan of the construction specified, so as to form a contracted channel, C, for the introduction of the juice, and an outlet, d, to bring it in sudden contact with the boiling sirup, all as herein explained, and for the purpose stated.

2. The combination of the transverse cold-air ducts D D with the wooden partition a a, as and for the purpose specified.

3. The combination of the hot-air chamber E, damper F, cold-air duct D, and chamber b'', all arranged as described.

E. W. SKINNER.

Witnesses:
DAVID ATWOOD,
A. H. MAIN.